UNITED STATES PATENT OFFICE.

CARLETON ELLIS, OF MONTCLAIR, NEW JERSEY.

EDIBLE FAT COMPLEX AND PROCESS OF MAKING SAME.

1,151,002.  Specification of Letters Patent.  Patented Aug. 24, 1915.

No Drawing.  Application filed April 19, 1913. Serial No. 762,296.

*To all whom it may concern:*

Be it known that I, CARLETON ELLIS, a citizen of the United States, and a resident of Montclair, in the county of Essex and State of New Jersey, have invented certain new and useful Improvements in Edible Fat Complex and the like and Processes of Making Same, of which the following is a specification.

This invention relates to an oily or fatty product, especially an edible product, and fatty substances intended for industrial purposes and to the process of making same and relates particularly to composite oils deodorized or improved in consistency by polymerization especially in conjunction with the step of hydrogenation or similar saturating treatment.

This application, so far as the polymerization of oils is concerned, is a continuation of certain matter filed July 26, 1912 now Patent No. 1,052,469 for process of making edible oils, etc., such continuity existing by virtue of my copending application No. 718,228, filed September 3, 1912 for hydrogenated fatty food product, now matured into Letters Patent 1,067,978 of July 22, 1913, and from which the subject matter of the present application especially as concerns the production of polymerized and hydrogenated oils has been immediately derived.

Unsaturated oils such as the glycerids containing more especially two or more double bondings or olefin groupings are capable of polymerization at elevated temperatures resulting in a thickening of the oil apparently due not so much to the formation of stearin as to the formation of oil complexes by the union of oil molecules one with another, usually denoted by a profound reduction of the iodin number and other changes.

In this manner castor, fish, whale, cotton, corn, linseed, rape and tung oil and the like may be polymerized to differing degrees and by such polymerization a thickening of the oil usually occurs which thickening produces a body of viscosity that enables hydrogenation, if carried out, to yield a product containing a fatty derivative of good texture or consistency and a hardened product which is not nearly so likely to grain undesirably as so frequently occurs with many purely hydrogenated products, which graining as I have noted in the latter above mentioned Letters Patent, is often objectionable in edible fats.

The polymerized oil further saturated if desired by hydrogenation or by hydroxylation may be used in making lubricants, or the product may be sulfonated by treatment with sulfuric acid or soaps may be prepared from the material by saponification with alkalis. By deodorization the oil may be rendered better adapted as an edible product. While the polymerization treatment, with or without hydrogenation, improves the odor of the oil in most cases, it is desirable in preparing an edible product to remove all traces of objectionable odors or any disagreeable taste and this if required may be secured by blowing the oil under high vacuum with superheated steam preferably at a temperature of 315° C. or higher, followed, if desired, by rapid chilling in order to prevent acquisition of odors during slow cooling.

My product is also of use in soap making for the reason that hardened or hydrogenated oil produced by hydrogenation is not capable of yielding soaps having as free lathering qualities as desired, while the polymerized and hardened hydrogenated oil of substantially the same consistency or degree of hardness shows superior lathering qualities when converted into soap.

To remove the odor from fish and whale oil by hydrogenation requires a considerable conversion to stearin. Usually it is necessary to reduce the iodin number of fish oil to about 50 in order to convert the unsaturated bodies such as clupanodonic glycerid which are supposed to be more or less odor producing into more saturated or entirely saturated bodies rendering the oil free from disagreeable fishy odor. But hydrogenation to this point produces so large a proportion of stearin which lathers freely as a soap only in very hot water that the product is deficient in lathering and consequent detergent properties. By polymerization the property of cold lathering existent in the soaps produced from normal fish oil is to a considerable degree present in the polymerized oils and any further hardening which may be desired and which is secured by hydrogenation does not impair these lathering qualities to any material degree in connection with the production of fats for making hard soaps. Hence polymerization enables the production from oils and fats of thickened or hardened products without the necessity of carrying hydrogenation forward to such a degree that the lathering properties of the soap made from such stock are seriously impaired.

Polymerized hydrogenated cotton-seed oil is a serviceable addition to various edible products as mentioned in Letters Patent No. 1,067,978.

As an illustrative example fish oil may be heated to about 250° C. for 12 hours in an atmosphere of hydrogen and may then be hydrogenated by treating for 2 hours at a somewhat lower temperature with hydrogen gas using voluminous nickel oxid as a catalyzer, or whale oil may be heated at 260° C. for 20 hours in an atmosphere of hydrogen or of a hydrogen-containing gas; or whale oil may be heated to 250° C. in the presence of a catalyzer and hydrogen for 4 hours. Preferably the hydrogen is passed through a body of the oil in such a manner as to keep the catalyzer, which should be finely divided, thoroughly disseminated through the body of oil. As a catalyzer or source of catalytic substance beside nickel oxid material, palladium, iron and the like may be employed.

By operating in this manner it is possible to condense or combine oils of dissimilar nature to produce entirely new edible or other products. Sufficient other oil may be combined with whale oil or other oils capable of polymerizing in this manner to produce complexes by the condensation of oils of different origin. Such composite polymerized products or complexes may if desired be hydrogenated or hydroxylated to any suitable extent.

Such new products form a part of the present invention. For example, 2 parts of fish oil and 1 part of whale oil may be polymerized by heating at about 250° C. for 18 hours in the presence of an inert gas, that is to say, with oxygen excluded. Similarly fish oil or whale oil may be combined more or less with corn or cotton-seed oil, or the more strongly drying oils and then if desired suitably hydrogenated.

The marine animal oils referred to herein comprise polymerizable oils derived from any part of fish or whale or oils of a similar character adapted for the purposes hereof.

To recapitulate, my invention involves or comprises the polymerization of oils, particularly fatty oils such as those having iodin numbers from 100 and upward, to form preferably edible fat complexes, such polymerization preferably taking place at a temperature of about 250° C. and the action being facilitated if desired by means of catalyzers and preferably hydrogenating the resulting complex which hydrogen addition may take place preferably either simultaneously or subsequent to polymerization; and my invention further involves the combining of two or more oils by polymerization or condensation so as to form preferably edible products containing oils of different origin in chemical combination, due to such condensation or polymerization and further involves the hydrogenation or hydroxylation or other hardening of such complex products of condensation.

What I claim is:

1. An edible fat product of composite nature comprising polymerized oil and hydrogenated oil.

2. A fatty product of a composite nature comprising a polymerized and hydrogenated oil.

3. A fatty product comprising hydrogenated, polymerized oil.

4. A fatty product comprising two or more oils, combined by condensation, and hydrogenated oil.

5. A fatty product comprising a hydrogenated polymerized oil composite.

6. A fatty product comprising hydrogenated, polymerized oil composite material comprising two or more fatty oils.

7. A fatty product comprising polymerized fish oil.

8. The process of preparing edible oils which comprises heat polymerizing a composite oil in an inert gas.

9. The process of preparing oily or fatty material which comprises combining a polymerizable marine animal oil with another fatty oil by heat polymerizing a mixture thereof.

10. The process of treating oils to adapt them for edible purposes which comprises interpolymerizing and hydrogenating a mixture of two or more polymerizable oils in a reducing gaseous atmosphere substantially devoid of oil discoloring agents.

11. The process of treating oils to adapt them for edible purposes which comprises heat polymerizing said oils in a reducing gas.

12. The process of treating fatty oils which comprises heat polymerizing mixed fatty oils in a reducing atmosphere.

13. The process of preparing edible fats which comprises heat polymerizing and hydrogenating fatty oils in a gaseous atmosphere substantially devoid of oil discoloring agent.

14. The process of treating oils which comprises polymerizing an oily mixture comprising polymerizable marine animal oil by heating at approximately 250° C. for about 18 hours in the presence of a gas free from oxygen.

Signed at Montclair in the county of Essex and State of New Jersey this 16th day of April A. D. 1913.

CARLETON ELLIS.

Witnesses:
B. M. ELLIS,
A. A. WELLS.